(12) United States Patent
Rheaume et al.

(10) Patent No.: US 10,300,431 B2
(45) Date of Patent: May 28, 2019

(54) ON-BOARD VEHICLE INERT GAS GENERATION SYSTEM

(71) Applicant: HAMILTON SUNDSTRAND CORPORATION, Windsor Locks, CT (US)

(72) Inventors: Jonathan Rheaume, West Hartford, CT (US); Stephen E. Tongue, Hampden, MA (US)

(73) Assignee: HAMILTON SUNDSTRANT CORPORATION, Windsor Locks, CT (US)

( * ) Notice: Subject to any disclaimer, the term of this patent is extended or adjusted under 35 U.S.C. 154(b) by 485 days.

(21) Appl. No.: 15/169,165

(22) Filed: May 31, 2016

(65) Prior Publication Data

US 2017/0341019 A1 Nov. 30, 2017

(51) Int. Cl.
*B01D 53/32* (2006.01)
*B01D 53/22* (2006.01)
(Continued)

(52) U.S. Cl.
CPC .............. *B01D 53/326* (2013.01); *A62C 3/08* (2013.01); *A62C 99/0018* (2013.01);
(Continued)

(58) Field of Classification Search
CPC ...... B01D 53/326; B01D 53/22; B01D 53/30; B64D 37/32; B64D 2037/325; A62C 99/0018; A62C 3/08
See application file for complete search history.

(56) References Cited

U.S. PATENT DOCUMENTS 3,590,559 A 7/1971 Bragg et al.
3,672,180 A 6/1972 Davis
(Continued)

FOREIGN PATENT DOCUMENTS

DE 4225170 A1 2/1994
DE 102009040013 A1 3/2011
(Continued)

OTHER PUBLICATIONS

Perry, et al., "Perrys-Chemical-Engineers-handbook" McGraw-Hill, 7th Ed., 1999, p. No. 22-64.
(Continued)

*Primary Examiner* — Arun S Phasge
(74) *Attorney, Agent, or Firm* — Cantor Colburn LLP

(57) ABSTRACT

An onboard inert gas system has an electrochemical and a membrane gas separator. The electrochemical separator includes an electrochemical cell including a cathode and anode separated by an electrolyte separator. An electrical power source provides power to the electrical circuit at a voltage that electrolyzes water at the anode and forms water at the cathode, or reduces oxygen at the cathode and forms oxygen at the anode. Oxygen is consumed at the cathode, providing nitrogen-enriched air. Nitrogen-enriched air from the cathode is connected by a flow path to the membrane gas separator, which comprises a membrane having a greater permeability to oxygen or water than to nitrogen. Nitrogen-enriched air from the membrane gas separator that is further enriched in nitrogen, reduced in water content, or both, is connected by a flow path to a fuel tank, a fire suppression system, or both a fuel tank and a fire suppression system.

22 Claims, 5 Drawing Sheets

(51) Int. Cl.
  *B01D 53/30* (2006.01)
  *B01D 69/08* (2006.01)
  *A62C 3/08* (2006.01)
  *A62C 99/00* (2010.01)
  *B64D 37/32* (2006.01)
  *B64D 45/00* (2006.01)

(52) U.S. Cl.
  CPC ............ *B01D 53/22* (2013.01); *B01D 53/30* (2013.01); *B01D 69/08* (2013.01); *B64D 37/32* (2013.01); *B01D 2313/243* (2013.01); *B64D 2045/009* (2013.01); *Y02T 50/44* (2013.01); *Y02T 50/54* (2013.01)

(56) References Cited

U.S. PATENT DOCUMENTS

| | | |
|---|---|---|
| 3,710,549 A | 1/1973 | Nichols et al. |
| 3,732,668 A | 5/1973 | Nichols |
| 3,788,039 A | 1/1974 | Bragg |
| 3,847,298 A | 11/1974 | Hamilton |
| 4,681,602 A | 7/1987 | Glenn et al. |
| 5,220,799 A | 6/1993 | Lievens et al. |
| 5,255,735 A | 10/1993 | Raghava et al. |
| 5,782,188 A | 7/1998 | Evans et al. |
| 5,843,212 A | 12/1998 | Nanaji |
| 6,012,533 A | 1/2000 | Cramer |
| 6,315,815 B1 | 11/2001 | Spadaccini et al. |
| 6,432,169 B1 | 8/2002 | Kluwe et al. |
| 6,440,317 B1 | 8/2002 | Koethe |
| 6,578,639 B1 | 6/2003 | Osime et al. |
| 6,705,092 B1 | 3/2004 | Zhou et al. |
| 6,729,359 B2 | 5/2004 | Jones |
| 6,840,292 B2 | 1/2005 | Hart et al. |
| 7,204,868 B2 | 4/2007 | Snow, Jr. |
| 7,459,081 B2 | 12/2008 | Koenig et al. |
| 7,517,388 B2 | 4/2009 | Jensvold |
| 7,595,019 B2 | 9/2009 | Cutler et al. |
| 7,628,965 B2 | 12/2009 | Johnson |
| 7,694,916 B2 | 4/2010 | Limaye et al. |
| 7,896,292 B2 | 3/2011 | Limaye |
| 7,905,259 B2 | 3/2011 | Johnson |
| 8,192,532 B1 | 6/2012 | Gupta |
| 8,245,978 B1 | 8/2012 | Beers et al. |
| 8,388,740 B2 | 3/2013 | Sohn et al. |
| 8,499,567 B2 | 8/2013 | Hagh |
| 8,602,362 B2 | 12/2013 | Buchwald |
| 8,763,712 B2 | 7/2014 | Kotliar |
| 8,801,831 B1 | 8/2014 | Snow, Jr. et al. |
| 8,813,860 B2 | 8/2014 | Bleil et al. |
| 8,882,886 B2 | 11/2014 | Evosevich et al. |
| 8,904,669 B2 | 12/2014 | Tichborne et al. |
| 8,925,865 B2 | 1/2015 | Stolte et al. |
| 8,950,703 B2 | 2/2015 | Bayliss et al. |
| 9,016,078 B2 | 4/2015 | Gupta |
| 9,096,326 B2 | 8/2015 | Dooley et al. |
| 9,114,886 B2 | 8/2015 | Gupta |
| 9,118,054 B2 | 8/2015 | Gummalla et al. |
| 9,120,571 B2 | 9/2015 | Kshirsagar et al. |
| 9,174,740 B2 | 11/2015 | Stolte et al. |
| 9,186,622 B1 | 11/2015 | Ranjan et al. |
| 9,216,931 B1 | 12/2015 | Su |
| 9,340,297 B2 | 5/2016 | Cao |
| 9,511,874 B2 | 12/2016 | Tiger |
| 9,623,981 B2 * | 4/2017 | Darling .................. B64D 37/32 |
| 9,687,773 B2 | 6/2017 | Johnson et al. |
| 2002/0152889 A1 | 10/2002 | Baker et al. |
| 2002/0160240 A1 | 10/2002 | Matsui et al. |
| 2003/0196645 A1 | 10/2003 | Kojima et al. |
| 2004/0226438 A1 | 11/2004 | Jones |
| 2005/0048334 A1 | 3/2005 | Sridhar et al. |
| 2005/0247197 A1 | 11/2005 | Snow, Jr. |
| 2006/0011063 A1 | 1/2006 | Zhou |
| 2006/0113248 A1 | 6/2006 | Koenig et al. |
| 2007/0039464 A1 | 2/2007 | Vanderhoof et al. |
| 2008/0128048 A1 | 6/2008 | Johnson et al. |
| 2008/0176174 A1 | 7/2008 | White et al. |
| 2009/0227195 A1 | 9/2009 | Buelow et al. |
| 2009/0321090 A1 | 12/2009 | Bleil et al. |
| 2009/0325014 A1 | 12/2009 | Newkirk |
| 2010/0006048 A1 | 1/2010 | Minty et al. |
| 2010/0107877 A1 | 5/2010 | Suzuki et al. |
| 2010/0155315 A1 | 6/2010 | Partridge et al. |
| 2010/0252005 A1 | 10/2010 | Kitamoto et al. |
| 2011/0003224 A1 | 1/2011 | Scheibert |
| 2011/0014536 A1 | 1/2011 | Yoshida |
| 2011/0262309 A1 | 10/2011 | Limaye |
| 2012/0035406 A1 | 2/2012 | Lam et al. |
| 2012/0292058 A1 | 11/2012 | Bleil et al. |
| 2012/0325811 A1 | 12/2012 | Hagh et al. |
| 2013/0071594 A1 | 3/2013 | Bikson et al. |
| 2013/0098314 A1 | 4/2013 | Imran et al. |
| 2013/0168111 A1 | 7/2013 | Wong et al. |
| 2013/0214464 A1 | 8/2013 | Lancho Doncel |
| 2013/0312743 A1 | 11/2013 | Kshirsagar et al. |
| 2014/0150649 A1 | 6/2014 | Stolte et al. |
| 2014/0208943 A1 | 7/2014 | Gupta |
| 2014/0251426 A1 | 9/2014 | Bando et al. |
| 2014/0252171 A1 | 9/2014 | Dooley et al. |
| 2014/0272659 A1 | 9/2014 | Lu et al. |
| 2015/0132214 A1 | 5/2015 | Eickhoff |
| 2015/0217153 A1 | 8/2015 | Jones |
| 2015/0344146 A1 | 12/2015 | Theodore et al. |
| 2015/0349356 A1 | 12/2015 | Ribarov et al. |
| 2015/0353201 A1 | 12/2015 | Hagh et al. |
| 2016/0030781 A1 | 2/2016 | Hoffjann et al. |
| 2016/0052639 A1 | 2/2016 | Burnell et al. |
| 2016/0064751 A1 | 3/2016 | Hoffjann et al. |
| 2016/0102261 A1 | 4/2016 | Lam et al. |
| 2016/0102032 A1 | 5/2016 | Du et al. |
| 2016/0167802 A1 | 6/2016 | Lo et al. |
| 2016/0176535 A1 | 6/2016 | Family et al. |
| 2016/0257419 A1 | 9/2016 | Artaud et al. |
| 2016/0361684 A1 | 12/2016 | Ranjan et al. |
| 2017/0122275 A1 | 5/2017 | Ishimitsu et al. |
| 2017/0145969 A1 | 5/2017 | Ishimitsu et al. |
| 2017/0167036 A1 | 6/2017 | Tew et al. |
| 2017/0331131 A1 | 11/2017 | Rheaume |
| 2017/0368496 A1 | 12/2017 | Rheaume et al. |
| 2018/0016025 A1 | 1/2018 | Rheaume et al. |

FOREIGN PATENT DOCUMENTS

| | | |
|---|---|---|
| DE | 102013100803 A1 | 7/2014 |
| EP | 3023518 A1 | 5/2016 |
| EP | 3260373 A1 | 12/2017 |
| GB | 1395691 | 5/1975 |
| JP | 2004022487 A | 1/2004 |
| WO | 9635634 | 11/1996 |
| WO | 2011117610 A1 | 9/2011 |

OTHER PUBLICATIONS

Woodford, et al., "Heat exchangers," pp. 1-7; Jan. 17, 2016; https://web.archive.org/web/20161030205435/http://www.explainthatstuff.com/how-heat-exchangers-work.html.

Search Report regarding related EP Application No. 17177967.1; dated Nov. 23, 2017; 8 pgs.

Partial Search Report regarding related EP Application No. 17171470.2; dated Nov. 30, 2017; 16 pgs.

Search Report regarding related EP Application No. 17170089.1; dated Oct. 12, 2017; 8 pgs.

EP Communication; Extended European Search Report; Application No. 17199034.4-1010; dated Jan. 10, 2018; pp. 1-19.

EP Communication; Extended European Search Report; Application No. 17200886.4-1010; dated Mar. 14, 2018; pp. 1-15.

European Search Report regarding Application No. 17171470.2-1113; dated Mar. 13, 2018; 13pgs.

Non-Final Office Action for U.S. Appl. No. 15/192,692, filed Jun. 24, 2016; Fuel Tank System and Method; dated Mov. 16, 2017; pp. 1-14.

(56) References Cited

OTHER PUBLICATIONS

Non-Final Office Action for U.S. Appl. No. 15/348,287, filed Nov. 10, 2016; On-Board Aircraft Reactive Inerting Dried Gas System; dated Feb. 9, 2018; pp. 1-37.

* cited by examiner

ON-BOARD VEHICLE INERT GAS GENERATION SYSTEM

BACKGROUND

This disclosure relates to vehicle systems, and in particular to an on-board vehicle inert gas generation system such as an aircraft inert gas generation system.

It is recognized that fuel vapors within fuel tanks become combustible in the presence of oxygen. An inerting system decreases the probability of combustion of flammable materials stored in a fuel tank by maintaining a chemically non-reactive or inert gas, such as nitrogen-enriched air, in the fuel tank vapor space also known as ullage. Three elements are required to initiate and sustain combustion: an ignition source (e.g., heat), fuel, and oxygen. Combustion may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of combustion by reducing the oxygen concentration by introducing an inert gas such as nitrogen-enriched air (NEA) to the ullage, thereby displacing oxygen with a mixture of nitrogen and oxygen at target thresholds for avoiding explosion or combustion.

It is known in the art to equip aircraft with onboard inert gas generating systems, which supply nitrogen-enriched air to the vapor space (i.e., ullage) within the fuel tank. The nitrogen-enriched air has a substantially reduced oxygen content that reduces or eliminates combustible conditions within the fuel tank. Onboard inert gas generating systems typically use membrane-based gas separators. Such separators contain a membrane that is permeable to oxygen and water molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and NEA on the high-pressure side of the membrane. The requirement for a pressure differential necessitates a source of compressed or pressurized air. Bleed air from an aircraft engine or from an onboard auxiliary power unit can provide a source of compressed air; however, this can reduce available engine power and also must compete with other onboard demands for compressed air, such as the onboard air environmental conditioning system and anti-ice systems. Moreover, certain flight conditions such as during aircraft descent can lead to an increased demand for NEA at precisely the time when engines could be throttled back for fuel savings so that that maintaining sufficient compressed air pressure for meeting the pneumatic demands may come at a significant fuel burn cost. Additionally, there is a trend to reduce or eliminate bleed-air systems in aircraft; for example Boeing's 787 has a no-bleed systems architecture, which utilizes electrical systems to replace most of the pneumatic systems in order to improve fuel efficiency, as well as reduce weight and lifecycle costs. Other aircraft architectures may adopt low-pressure bleed configurations where engine design parameters allow for a bleed flow of compressed air, but at pressures less than the 45 psi air (unless stated otherwise, "psi" as used herein means absolute pressure in pounds per square inch, i.e., psia) that has been typically provided in the past to conventional onboard environmental control systems. A separate compressor or compressors can be used to provide pressurized air to the membrane gas separator, but this undesirably increases aircraft payload, and also represents another onboard device with moving parts that is subject to maintenance issues or device failure.

The concern with combustion as a significant risk management issue for aircraft is not limited to the fuel tanks, and commercial and military aircraft are often equipped with fire suppression technology such as halocarbon systems that disperse a halocarbon such as Halon 1301 as a clean fire suppressant. Halocarbons interrupt the chain reactions that propagate the combustion process. Unfortunately, although halocarbons are deleterious to the ozone layer and are furthermore greenhouse gases, it has been difficult to discontinue their use because of a dearth of viable alternatives. Typically multiple tanks of Halon are on board aircraft for fire suppression with respect to both the initial inrush (knockdown) as well as for the replacement of Halon and air lost to leakage at a low rate of discharge (LRD).

BRIEF DESCRIPTION

According to some embodiments of this disclosure, an on-board vehicle inert gas system comprises a plurality of electrochemical cells. The cells individually comprise a cathode and an anode separated by an electrolyte separator. A cathode fluid flow path is in fluid communication with the cell cathodes. The cathode fluid flow path receives a flow of air from an air source and discharges nitrogen-enriched air. An anode fluid flow path is in fluid communication with the cell anodes. An electrical circuit connects the anode and the cathode. In a mode of operation, an electrical power source is connected to the electrical circuit. The electrical power source provides power to the electrical circuit at a voltage that electrolyzes water at the anode and forms water at the cathode, or that reduces oxygen at the cathode and forms oxygen at the anode. The system also includes a membrane gas separator comprising a membrane having a greater permeability to oxygen or water than to nitrogen. A nitrogen-enriched air flow path along a first side of the membrane receives nitrogen-enriched air from the cathode fluid flow path and discharges nitrogen-enriched air that is further enriched in nitrogen or reduced in water content to a fuel tank, a fire suppression system, or both a fuel tank and a fire suppression system. An exhaust flow path along a second side of the membrane receives oxygen or water through the membrane for exhaust from the on-board inert gas system.

In some embodiments of the disclosure, a method of generating inert gas on board a vehicle comprises providing water or air at an anode of an electrochemical cell, providing air at a cathode of the electrochemical cell, providing electric power to a circuit connecting the anode and the cathode at a voltage to electrolyze water at the anode or reduce oxygen at the cathode. Nitrogen-enriched air is generated at the cathode of the electrochemical cell. The nitrogen-enriched air from the cathode of the electrochemical cell is directed to a nitrogen-enriched flow path on a first side of a membrane having a greater permeability to oxygen or water than to nitrogen. Oxygen or water from the nitrogen-enriched flow path is transported across the membrane to a second side of the membrane. Nitrogen-enriched air further enriched in nitrogen is directed from the nitrogen-enriched flow path on the first side of the membrane to a fuel tank, a fire suppression system, or both a fuel tank and a fire suppression system.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
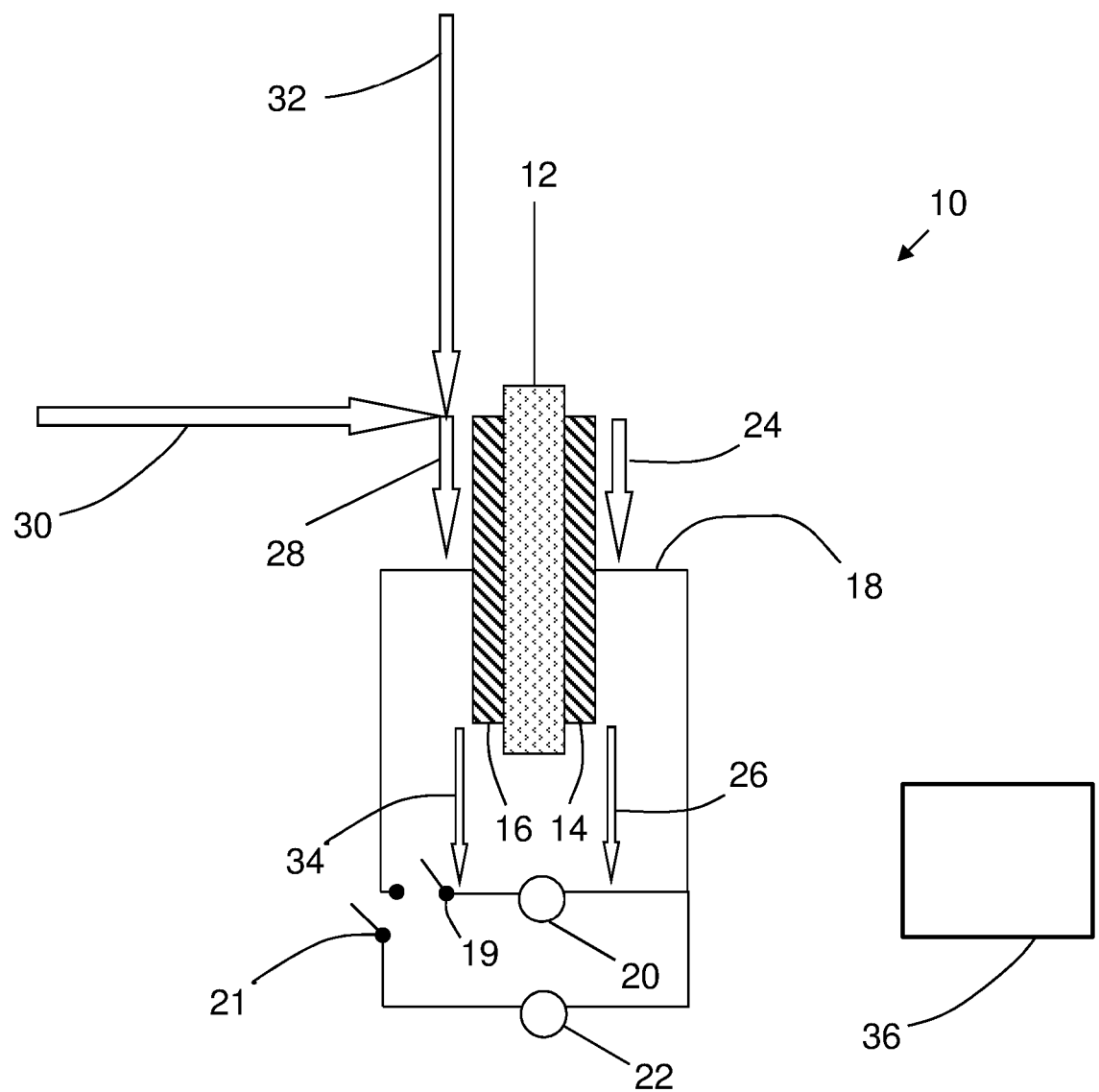
FIG. 1 is a schematic depiction of an example embodiment of an electrochemical cell.

As mentioned above, the on-board vehicle inert gas system comprises an electrochemical cell. The term "vehicle" includes any powered conveyance device, including but not limited to aircraft, marine vessels, railroad engines, or roadway motor vehicles. In some embodiments, the vehicle is an aircraft. In some embodiments, the vehicle is a marine vessel such as a marine vessel fueled by liquefied natural gas (LNG). Referring now to the Figures, in which the same numbering may be used in more than one Figure to represent the same feature without the necessity of explicit repetition in the description for each Figure, FIG. 1 schematically depicts an electrochemical cell 10. In this description, a single electrochemical cell is shown for ease of illustration; however, in practice there would typically be a plurality of cells electrically connected in series as a stack and perhaps a plurality of stacks connected either in series or in parallel. The electrochemical cell 10 comprises an electrolyte 12 having a cathode 14 disposed on one side and an anode 16 disposed on the other side. Cathode 14 and anode 16 are positioned adjacent to, and preferably in contact with the electrolyte 12 and can be metal layers deposited (e.g., by vapor deposition) onto the electrolyte 12, or can have structures comprising discrete catalytic particles adsorbed onto a porous substrate that is attached to the electrolyte 12. Alternatively, the catalyst particles can be deposited on high surface area powder materials (e.g., graphite or porous carbons or metal-oxide particles) and then these supported catalysts may be deposited directly onto the electrolyte 12 or onto a porous substrate that is attached to the electrolyte 12. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of the electrolyte 12. In either case, the cathode and anode layers 14 and 16 may also include a binder material, such as a polymer, especially one that also acts as an ionic conductor. In this case, the cathode and anode layers 14 and 16 may be cast from an "ink," which is a suspension of supported (or unsupported) catalyst, ionomer, and a solvent that is typically an aqueous solution (e.g., a mixture of alcohol(s) and water) using processes that are like those used to make catalyst layers used in conjunction with electrolytes in fuel cells. Cathode 14 and anode 16 can be fabricated from catalytic materials suitable for performing the needed electrochemical reaction (e.g., the oxygen-reduction reaction on the cathode and the electrolysis of water on the anode). Exemplary catalytic materials include, but are not limited to, platinum, palladium, rhodium, carbon, gold, tantalum, tungsten, ruthenium, iridium, osmium, alloys thereof, and the like, as well as combinations of the foregoing materials.

The cathode 14 and anode 16 can be controllably electrically connected by electrical circuit 18 through controllable switch 19 to an electric power source 20 (e.g., DC power rectified from AC power produced by a generator powered by a gas turbine engine used for propulsion or by an auxiliary power unit). Switches 19 and 21 can be controlled by a controller 36. In some embodiments, the system can optionally include a connection through controllable switch 21 to an electric power sink 22 (e.g., one or more electricity-consuming systems or components onboard the vehicle) with appropriate power conditioning, or power bus(es) for such on-board electricity-consuming systems or components, for optional operation in an alternative fuel cell mode. Inert gas systems with electrochemical cells that can alternatively operate to produce nitrogen-enriched air in a fuel-consuming power production (e.g., fuel cell) mode or a power consumption mode (e.g., electrolyzer cell) are disclosed in pending U.S. patent application Ser. No. 15/151,132 filed May 10, 2016, the disclosure of which is incorporated herein by reference in its entirety.

With continued reference to FIG. 1, cathode fluid flow path 24 directs air from an external source (e.g., fan, compressor, ram air flow) into contact with the cathode 14. Oxygen is electrochemically depleted from air along the cathode fluid flow path 24, and is discharged as nitrogen-enriched air (NEA) at cathode exhaust 26 for delivery to an on-board fuel tank (not shown), or to a vehicle fire suppression system associated with an enclosed space (not shown), or controllably to either or both of a vehicle fuel tank or an on-board fire suppression system. An anode fluid flow path 28 is configured to controllably receive water along a first anode flow path 30 if the electrochemical cell is configured for proton transfer across the electrolyte 12 (e.g., a proton exchange membrane (PEM) electrolyte or phosphoric acid electrolyte). If the electrochemical cell is configured for oxygen anion transfer across the electrolyte 12 (e.g., a solid oxide electrolyte), it can optionally be configured to receive air along the anode flow path 30. Although not stoichiometrically required by the electrochemical reactions of the solid oxide electrochemical cell, airflow to the anode during power-consumption mode can have the technical effects of diluting the potentially hazardous pure heated oxygen at the anode, and providing thermal regulation to the cell. If the system is configured for alternative operation in a fuel cell mode, the anode fluid flow path 28 can be configured to controllably also receive fuel (e.g., hydrogen for a proton-transfer cell, hydrogen or hydrocarbon reformate for a solid oxide cell) along a second flow path 32. Anode exhaust 34 can, depending on the type of cell and the anode exhaust content, be exhausted or subjected to further processing. Control of fluid flow along these flow paths can be provided through conduits and valves (not shown), which can be controlled by a controller 36.

In some embodiments, the electrochemical cell 10 can operate utilizing the transfer of protons across the electrolyte 12. Exemplary materials from which the electrochemical proton transfer electrolytes can be fabricated include proton-conducting ionomers and ion-exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION™ resins (commercially available from E. I. du Pont de Nemours and Company, Wilmington, Del.). Alternatively, instead of an ion-exchange membrane, the electrolyte 12 can be comprised of a liquid electrolyte, such as sulfuric or phosphoric acid, which may preferentially be absorbed in a porous-solid matrix material such as a layer of silicon carbide or a polymer than can absorb the liquid electrolyte, such as poly(benzoxazoie). These types of alternative "membrane electrolytes" are well known and have been used in other electrochemical cells, such as phosphoric-acid fuel cells.

During operation of a proton transfer electrochemical cell in the electrolyzer mode, water at the anode undergoes an electrolysis reaction according to the formula $$H_2O \rightarrow \tfrac{1}{2}O_2 + 2H^+ + 2e^- \quad (1)$$

The electrons produced by this reaction are drawn from an electrical circuit 18 powered by electric power source 20 connecting the positively charged anode 16 with the cathode 14 with switch 19 closed and switch 21 open. The hydrogen ions (i.e., protons) produced by this reaction migrate across the electrolyte 12, where they react at the cathode 14 with oxygen in the cathode flow path 24 to produce water according to the formula $$\tfrac{1}{2}O_2 + 2H^+ + 2e^- \rightarrow H_2O \quad (2)$$

Removal of oxygen from cathode flow path 24 produces nitrogen-enriched air exiting the region of the cathode 14. The oxygen evolved at the anode 16 by the reaction of formula (1) is discharged as oxygen or an oxygen-enriched air stream as anode exhaust 34.

During operation of a proton transfer electrochemical cell in a fuel cell mode, fuel (e.g., hydrogen) at the anode undergoes an electrochemical oxidation according to the formula $$H_2 \rightarrow 2H^+ + 2e^- \quad (3)$$

The electrons produced by this reaction flow through electrical circuit 18 to provide electric power to electric power sink 22 with switch 19 open and switch 21 closed. The hydrogen ions (i.e., protons) produced by this reaction migrate across the electrolyte 12, where they react at the cathode 14 with oxygen in the cathode flow path 24 to produce water according to the formula (2).

$$\tfrac{1}{2}O_2 + 2H^+ + 2e^- \rightarrow H_2O \quad (2)$$

Removal of oxygen from cathode flow path 24 produces nitrogen-enriched air exiting the region of the cathode 14. Any unreacted hydrogen that exits anode 16 via anode exhaust flow path 34 can be recycled to fuel flow path 32 using an ejector or blower (not shown).

As mentioned above, the electrolysis reaction occurring at the positively charged anode 16 requires water, and the ionic polymers used for a PEM electrolyte perform more effectively in the presence of water. Accordingly, in some embodiments, a PEM membrane electrolyte is saturated with water or water vapor. Although the reactions (1) and (2) are stoichiometrically balanced with respect to water so that there is no net consumption of water, in practice moisture will be removed by NEA 24 (either entrained or evaporated into the nitrogen-enriched air) as it exits from the region of cathode 14. Accordingly, in some exemplary embodiments, water is circulated past the anode 16 along an anode fluid flow path (and optionally also past the cathode 14). Such water circulation can also provide cooling for the electrochemical cells. In some exemplary embodiments, water can be provided at the anode from humidity in air along an anode fluid flow path in fluid communication with the anode. In other embodiments, the water produced at cathode 14 can be captured and recycled to anode 16 (not shown). It should also be noted that, although the embodiments are contemplated where a single electrochemical cell is employed, in practice multiple electrochemical cells will be electrically connected in series with fluid flow to the multiple cathode and anode flow paths routed through manifold assemblies.

In some embodiments, the electrochemical cell 10 can operate utilizing the transfer of oxygen anions across the electrolyte 12. Exemplary materials from which the electrochemical oxygen anion-transporting electrolytes can be fabricated include solid oxides such as yttria-stabilized zirconia and/or ceria doped with rare earth metals. These types of materials are well known and have been used in solid oxide fuel cells (SOFC).

During operation of an oxygen anion transfer electrochemical cell in a power consuming (e.g., electrolyzer) mode, oxygen at the cathode undergoes an electrochemical reduction reaction according to the formula $$\tfrac{1}{2}O_2 + 2e^- \rightarrow O^= \quad (4)$$

The electrons consumed by this reaction are drawn from an electrical circuit 18 powered by electric power source 20 connecting the positively charged anode 16 with the cathode 14 with switch 19 closed and switch 21 open. The oxygen anions produced by this reaction migrate across the electrolyte 12, where they undergo an electrochemical oxidation reaction at the anode 14 according to the formula $$O^= \rightarrow \tfrac{1}{2}O_2 + 2e^- \quad (5)$$

In some embodiments, a flow of air from an airflow source (e.g., airflow source Removal of oxygen from cathode flow path 24 produces nitrogen-enriched air exiting the region of the cathode 14. The oxygen produced at the anode 16 by the reaction of formula (5) is discharged as oxygen or an oxygen-enriched air stream as anode exhaust 34.

During operation of an oxygen ion transfer electrochemical cell in a fuel cell mode, oxygen at the cathode undergoes an electrochemical reduction reaction according to the formula $$\tfrac{1}{2}O_2 + 2e^- \rightarrow O^= \quad (4)$$

The electrons consumed by this reaction are drawn from electrons liberated at the anode, which flow through electrical circuit 18 to provide electric power to electric power sink 22 with switch 19 open and switch 21 closed. The oxygen anions produced by this reaction migrate across the electrolyte 12, where they react with fuel such as hydrogen at the anode according to the formula $$H_2 + O^= \rightarrow H_2O + 2e^- \quad (6)$$

Carbon monoxide (e.g., contained in fuel reformate) can also serve as fuel in solid oxide electrochemical cells. In this case, the oxygen anions produced at the cathode according to formula (4) migrate across the electrolyte 12 where they react with carbon monoxide at the anode according to the formula $$CO + O^= \rightarrow CO_2 + 2e^- \quad (7)$$

Removal of oxygen from cathode flow path 24 produces nitrogen-enriched air exiting the region of the cathode 14. The steam and carbon dioxide produced at the anode 16 by the reactions of formulas (6) and (7) respectively is discharged along with unreacted fuel as anode exhaust 34. The unreacted fuel that exits anode 16 via anode exhaust flow path 34 can be recycled to fuel flow path 32 using an ejector or blower (not shown). It can also be fed to a fuel processing unit wherein the steam and carbon dioxide contribute to reforming.

In some embodiments, a controller 36 can be in operative communication with the electrochemical cell, the membrane gas separator, and any associated valves, pumps, compressors, conduits, or other fluid flow components, and with switches, inverters, regulators, sensors, and other electrical system components, and any other system components to selectively operate the inert gas system. These control connections can be through wired electrical signal connections (not shown) or through wireless connections. In some embodiments, the controller 36 can be configured to operate the system according to specified parameters, as discussed in greater detail further below.

As mentioned above, the inert gas system also includes a membrane gas separator that receives nitrogen-enriched air from the electrochemical chemical. In some embodiments, the membrane gas separator can comprise a membrane that has greater permeability to oxygen than to nitrogen. The membrane is exposed to pressurized air, such that oxygen molecules preferentially (compared to the larger nitrogen molecules) diffuse through the membrane, resulting in an oxygen-enriched gas on one side of the membrane and a nitrogen-enriched gas on the other side of the membrane. The difference in bulk gas pressure (dP) across the membrane can vary depending on the pressure of available pressurized air and separator unit configuration and capacity. For hollow fiber separators, the dP across the fiber is typically relatively high at the air inlet and relatively low at the NEA retentate outlet. In some onboard aircraft embodiments utilizing engine bleed flow as an air source, hollow fiber separator units can be configured with a separation zone having a dP across the fiber membranes in a range having a low end 3 psi, more specifically of 5 psi and more specifically 7 psi, more specifically 10 psi, and more specifically 15 psi, and an upper end of 200 psi, more specifically 60 psi, more specifically 45 psi, and even more specifically 40 psi. These range endpoints can be independently combined to disclose a number of different ranges. In some embodiments, the membrane comprises hollow tubes or fibers, with the NEA retentate flow path through the hollow interior of the fibers and the exhaust permeate flow path through the exterior of the fibers. Example embodiments of hollow tubes or fibers and separation devices utilizing the hollow tubes or fibers are shown, for example, in U.S. Pat. No. 9,186,622, the disclosure of which is incorporated herein by reference in its entirety. The effectiveness of membranes at performing the task of separating gases can be characterized by a trade-off that membranes experience between permeability of the membrane to the gas molecules targeted for diffusion across the membrane versus selectivity of the membrane between the targeted gas molecules and other molecules in the gas mixture. A plot of the collection of permeability versus selectivity values for various materials is known as a Robeson plot, and the upper performance limit of membrane materials is identified by a line along that plot known as the Robeson limit. Various types of materials and device configurations have been used for membrane separation of nitrogen and oxygen, including but not limited to those disclosed in the above-referenced U.S. Pat. No. 9,186,622. Other membrane materials include inorganic metal oxides of various compositions and crystal structures have been disclosed, as have various types of polymer and/or polymer composite materials.

Figure 2:
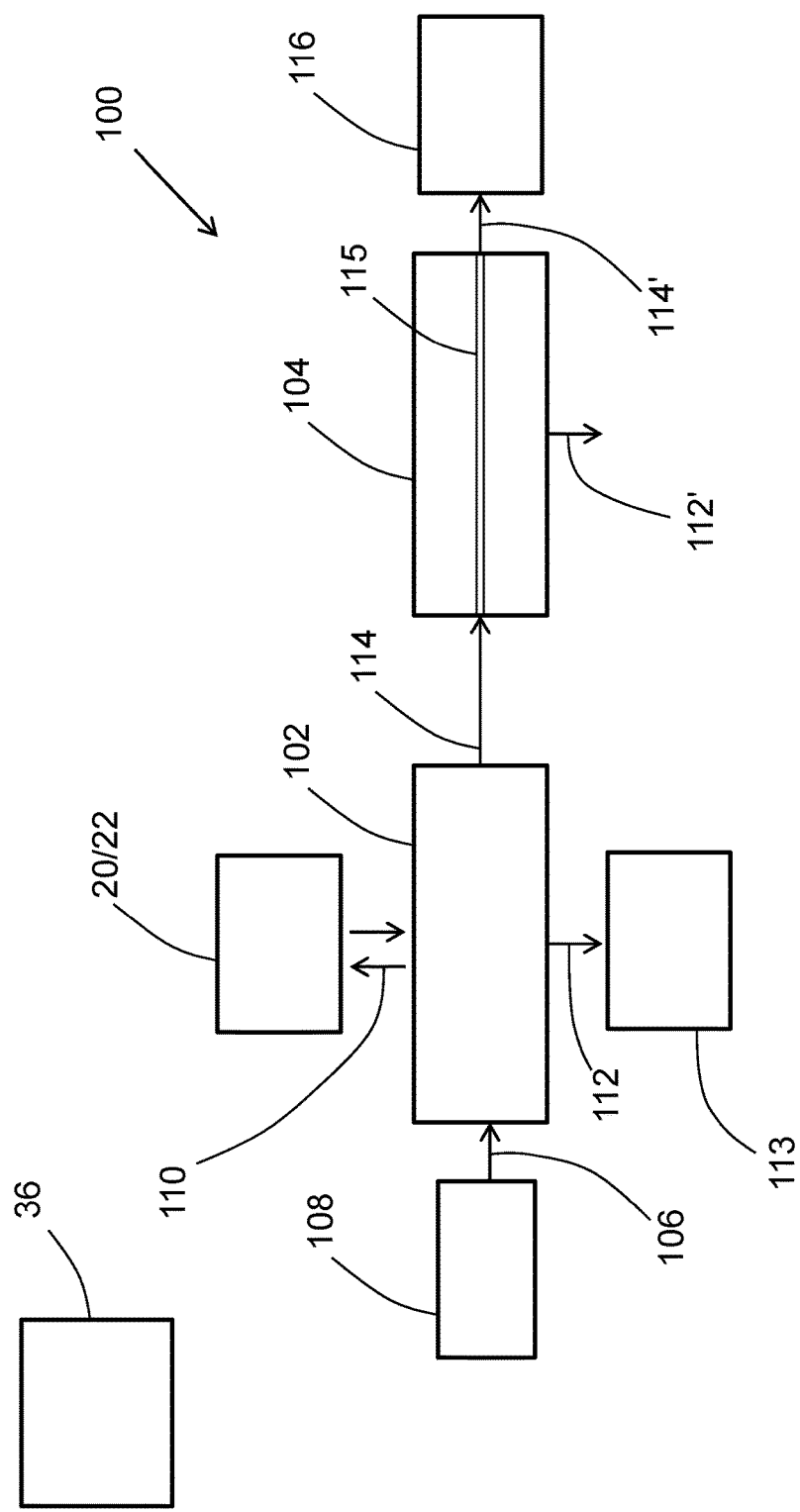
FIG. 2 is a schematic depiction of an example embodiment of an inert gas system comprising an electrochemical cell and a nitrogen/oxygen membrane gas separator.

An example embodiment of an inert gas system utilizing a nitrogen/oxygen membrane gas separator is schematically depicted in FIG. 2. As shown in FIG. 2, inert gas system 100 includes an electrochemical cell, cell stack, or plurality of cell stacks 102 and a nitrogen/oxygen membrane gas separator 104. Air 106 from an air source 108 is fed to a cathode side flow path in the electrochemical cell (stack(s)) 102, where oxygen is either removed or consumed by the electrochemical reactions (2) or (4) above. Various types of air sources can be used, including but not limited to air from a compressor section of an onboard turbocompressor engine, air from a mechanically driven compressor such as a compressor powered by a rotating shaft connected to an auxiliary power unit turbine, air from an electrically powered compressor, ram air, conditioned air, and air set in motion by fans, blowers, etc. In some embodiments, compressed air is used in order to provide a target pressure at the oxygen/nitrogen membrane separator 104. In some embodiments, the compressed air is at a pressure of 25 to 60 psi (e.g., aircraft engine bleed air). In some embodiments (e.g., where a vehicle environmental control system is configured to operate at a lower pressure than conventional aircraft engine bleed air such as an all-electric aircraft architecture), the compressed air is at a lower pressure such as 5 to 20 psi. Depending on whether the electrochemical cell (stack(s)) 102 is operating in power consuming mode (e.g., electrolyzer mode) or power producing mode (e.g., fuel cell mode), electric power 110 is provided to or received from the electrochemical cell (stack(s)) 102 by a power source 20 or the power sink 22. Nitrogen-enriched air 114 from the cathode side flow path is directed to the nitrogen/oxygen membrane gas separator 104, and oxygen-enriched air 112 from the anode side flow path can be exhausted to the outside or, if the system is operating at or above cabin pressure, discharged to a destination 113 such as a flight deck or cabin, or an engine intake, or an emergency oxygen system. Additional oxygen 112' is removed across the hollow tube/fiber membrane 115 by the nitrogen/oxygen membrane gas separator 104, and further enriched nitrogen-enriched air 114' can be directed to onboard inert gas consuming systems 116 such as either or both of a fuel tank and a fire suppression system. In some embodiments, the further enriched nitrogen-enriched air 114' can have an oxygen concentration sufficiently low (e.g., <10 ppm wt. that it can be used to sparge (i.e., bubble through) the liquid fuel to remove dissolved oxygen from the liquid fuel by introducing the further enriched nitrogen-enriched air 114' to a liquid fuel space in the tank.

Figure 3:
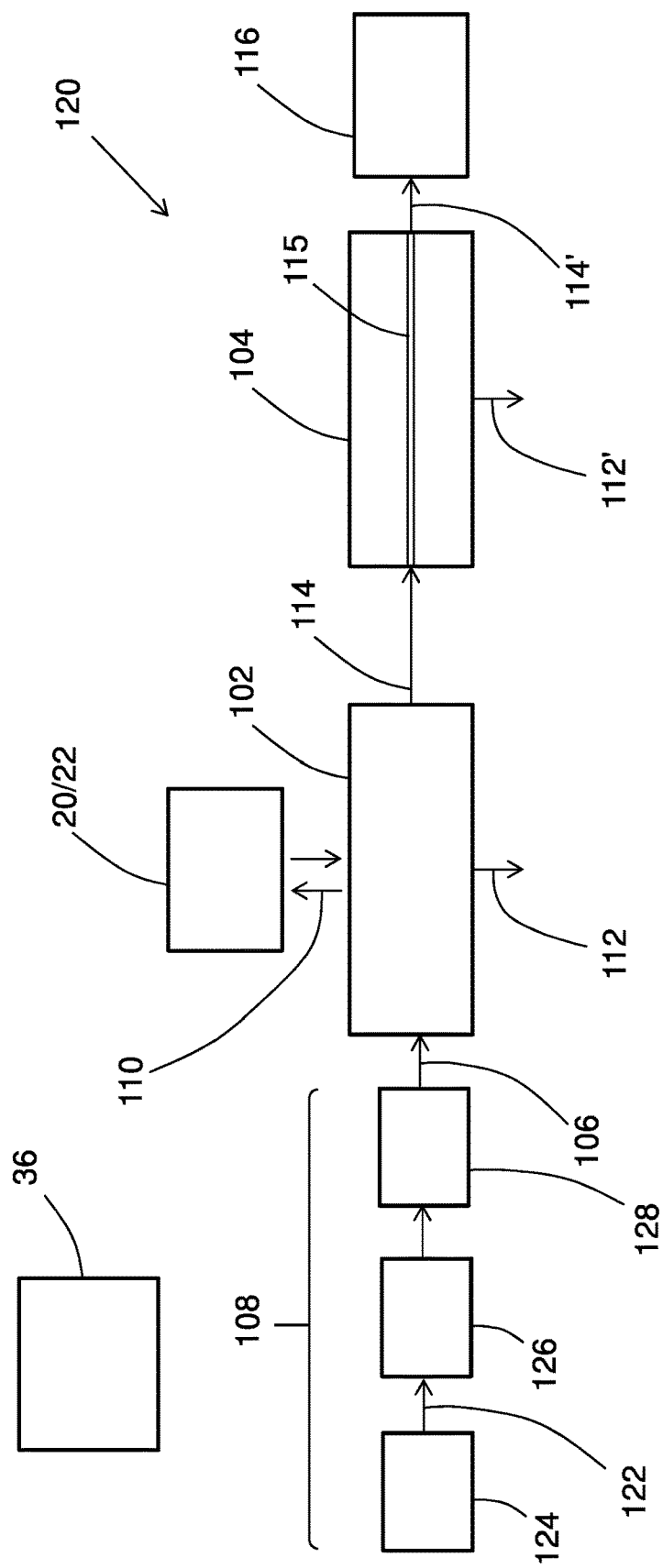
FIG. 3 is a schematic depiction of an example embodiment of an inert gas system comprising an electrochemical cell and a nitrogen/oxygen membrane gas separator with a low pressure engine bleed air source.

In some embodiments, the inert gas system can be retrofit from an existing onboard fuel tank inerting system such as a hollow fiber oxygen/nitrogen membrane separator system. An example of an embodiment of a system configuration 120 suitable for retrofitting or for new installation of a PEM electrochemical cell is depicted in FIG. 3. As shown in FIG. 3, the air source 108 comprises a bleed flow 122 from a compressor section of turbocompressor 124 is directed to a pre-cooler 126 proximate to the turbocompressor, where it is cooled to a temperature at which it can be safely transported in proximity to vehicle structures such as aluminum structures. From there, the cooled bleed flow is directed to a heat exchanger 128, where it is further cooled to an electrochemical cell process temperature before being directed to the electrochemical cell (stack(s)) 102. If a solid oxide electrochemical cell were used, a different heat management balance of plant would be needed due to the high operating temperature of the solid oxide cell compared to the <100° C. temperature of the membrane gas separator. However, the <100° C. operating temperature of the PEM cell is compatible with that of the membrane gas separator, and in some embodiments (not shown) PEM electrochemical cell (stack(s)) 102 can be retrofit into an onboard system utilizing any or all of an original equipment or previously-installed source of bleed flow 122, an original equipment or previously-installed pre-cooler 126, or an original equipment or previously-installed fuel tank inerting heat exchanger (FTI HX) as heat exchanger 128. The remaining components of FIG. 3 are the same as FIG. 1, the details of which are described above.

During operation, the system can be controlled to set fluid flow rates (e.g. air, fuel, or water feed rates) and the current or voltage levels required by the electric power sink 22 or produced by electric power source, to produce varying amounts of NEA in response to system parameters. Such system parameters can include, but are not limited to temperature of the fuel in the vehicle fuel tank(s), oxygen content of the fuel in the fuel tanks, oxygen content of vapor in the ullage of fuel tanks, temperature rise in an enclosed space such as a cargo hold or avionics bay, smoke and/or flame detection in said enclosed spaces, and temperature and/or pressure of vapor in the ullage of fuel tanks, and other on-board parameters such as temperature, oxygen content, and/or humidity level of air feed to the electrochemical cell. Accordingly, in some embodiments, the inert gas management system and components thereof such as shown in FIGS. 1-5 can include sensors for measuring any of the above-mentioned fluid flow rates, temperatures, oxygen levels, humidity levels, or current or voltage levels, as well as controllable output fans or blowers, or controllable fluid flow control valves or gates. These sensors and controllable devices can be operatively connected to the controller 36, which can be an independent controller dedicated to controlling the inert gas management system or the electrochemical cell, or can interact with other onboard system controllers or with a master controller. In some embodiments, data provided by the controller of the inert gas management system can come directly from a master controller.

As mentioned above, the system can include a controller 36, which can be in operative communication with the electrochemical cell, the membrane gas separator, and any associated valves, pumps, compressors, conduits, or other fluid flow components, and with switches, inverters, regulators, sensors, and other electrical system components, and any other system components to selectively operate the inert gas system. These control connections can be through wired electrical signal connections (not shown) or through wireless connections. In some embodiments, the controller 36 can be configured to operate the system according to specified parameters. For example, in some embodiments the controller 36 can be configured to operate each of the electrochemical cell (stack(s)) 102 and the membrane gas separator 104 at its own specified nitrogen-enriched air production capacity according to predetermined criteria including demand for nitrogen-enriched air (e.g., from an ullage inerting gas management protocol, or from a fire-suppression system activation signal) and an estimated impact on fuel burn from operation of the inert gas system 100. In some embodiments, the controller 36 can be configured to operate the membrane gas separator 104 continuously to provide a baseline nitrogen-enriched air production capacity and to operate the electrochemical cell (stack(s)) 102 intermittently or at a variable nitrogen-enriched air production capacity in response to demand for nitrogen-enriched air, or the difference between the production output of the gas separator 104 and the demand for nitrogen-enriched air. In some embodiments, the controller 36 can be configured to operate the electrochemical cell (stack(s)) 102 continuously to provide a baseline nitrogen-enriched air production capacity and to operate the membrane gas separator 104 intermittently or at a variable nitrogen-enriched air production capacity in response to demand for nitrogen-enriched air, or the difference between the production output of the electrochemical cell (stack(s)) 102 and the demand for nitrogen-enriched air. In some embodiments, the controller 36 can be configured to operate the membrane gas separator 104 at a nitrogen-enriched air production capacity based on availability and pressure of air from the air source 108 (e.g., a compressed air bleed from a compressor section of turbocompressor engine set by engine operating parameters), and to operate the electrochemical cell (stack(s)) 102 at a variable nitrogen-enriched air production capacity in response to a difference between nitrogen-enriched air production capacity of the membrane gas separator 104 and demand for nitrogen-enriched air.

Figure 4:
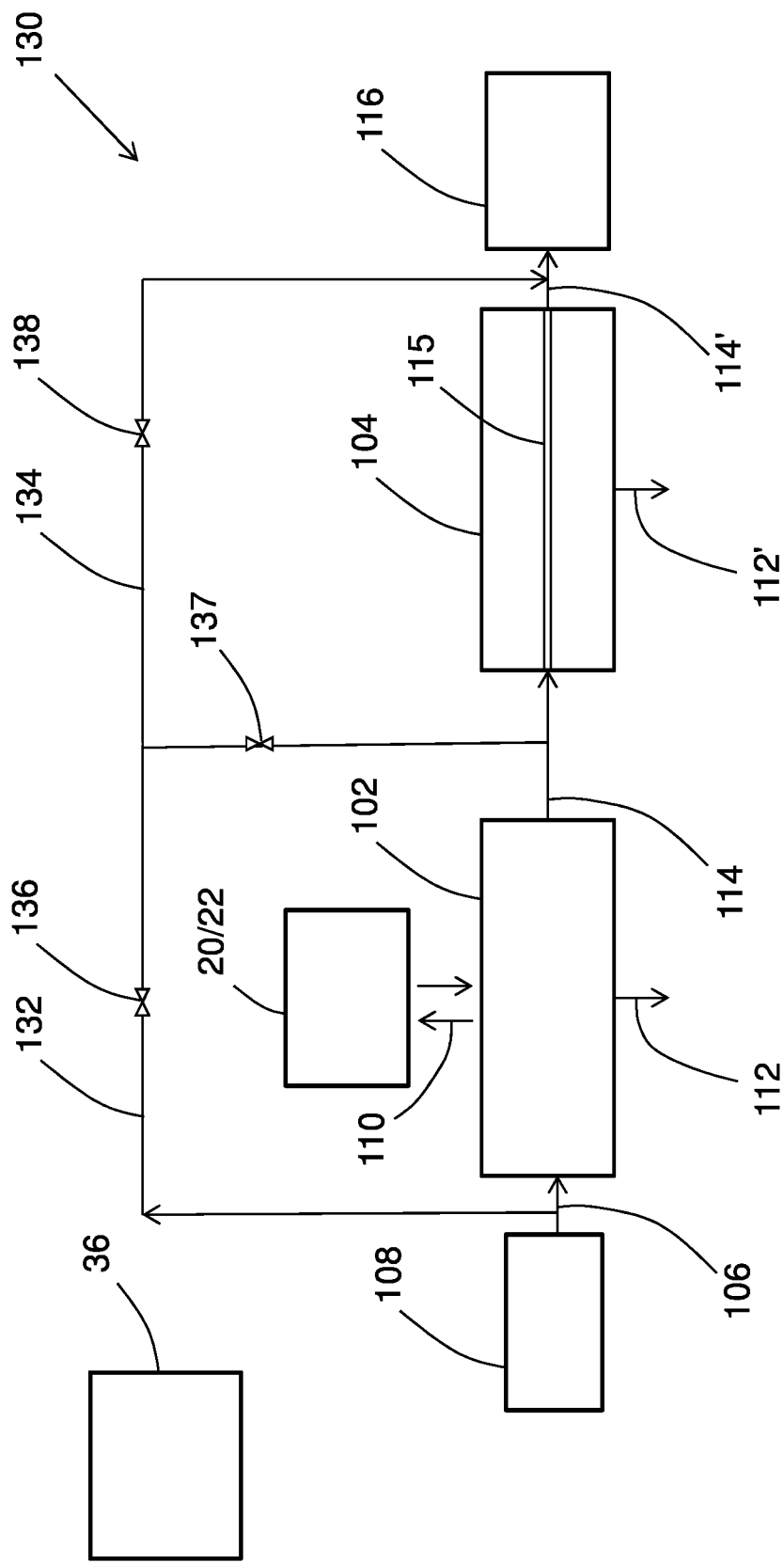
FIG. 4 is a schematic depiction of an example embodiment of an inert gas system comprising an electrochemical cell and a nitrogen/oxygen membrane gas separator with bypass control.

In some embodiments, the controller 36 can be configured to bypass either of the electrochemical (stack(s)) 102 or the membrane gas separator 104 (optionally putting the bypassed unit in shut-down or stand-by mode). FIG. 4 schematically depicts a system 130 similar to that of FIG. 2, but with bypass 132 around the electrochemical (stack(s)) 102, and bypass 134 around the membrane gas separator 104. Valves 136, 137, and 138 controlled by controller 136 can control flow through the units or the bypasses, respectively. In some embodiments, the controller 36 is configured to operate the electrochemical cell (stack(s)) 102 continuously as a source of nitrogen-enriched air through the bypass 134, and to redirect nitrogen-enriched air away from the bypass 134 and through the membrane gas separator 104 in response to a nitrogen-enriched air demand signal, or a difference between a production capacity of the electrochemical cell (stack(s)) 102 and the demand for nitrogen-enriched air. In some embodiments, the controller 36 is configured to operate the membrane gas separator 104 through the bypass 132 continuously as a source of nitrogen-enriched air, and to redirect nitrogen-enriched air away from the bypass 132 and through the electrochemical cell (stack(s)) 102 in response to a nitrogen-enriched air demand signal, or a difference between a production capacity of the membrane gas separator 104 and the demand for nitrogen-enriched air.

The choice of how the gas separators 102 and 104 are operated can depend on the relative availability of power. For example, when pneumatic power is sufficiently abundant such that the membrane gas separator 104 can meet the load without assistance from the electrochemical cell (stack(s)) 102, electric power 110 provided to the electrochemical cell (stack(s)) 102 can be reduced or eliminated, and the separator 102 can be bypassed resulting in vehicle fuel savings by avoiding the work extraction and corresponding fuel consumption to generate electricity using an engine-driven generator. In other modes of operation such as when pneumatic power is insufficiently available to adequately meet the demand for nitrogen-enriched air using the membrane gas separator 104 (e.g., during descent when the propulsion engines are throttled back), the electrochemical cell (stack(s)) 102 are then operated to supplement operation of the membrane gas separator 104. When the membrane gas separator 104 produces a low volumetric flow of NEA 114, then the concentration of oxygen can be lowered by the electrochemical cell (stack(s)) 102 so as to maintain an oxygen concentration in the space 116 targeted for resistance to fire or smoldering can occur, typically 12% oxygen in commercial aviation applications. In some embodiments, it is possible to use the inert gas generating system 100 with supply air 106 of relatively low pressure such that the bulk gas pressure provided to the membrane gas separator 104 is insufficient to transport oxygen (or significant amounts of oxygen) across the membrane, in which case the membrane gas separator 104 can serve primarily to remove water vapor from the nitrogen-enriched air 114 from PEM electrochemical cell (stack(s)). Thus by using the electrochemical cell (stack(s)) 102 to supplement the membrane gas separator 104, the technical effect of efficiently sizing the design of the membrane gas separator 104 for cruise flight operation (instead of for peak load). The combination of separators 102 and 104 allows for a system 100 that operates using a source of air 108 at low pressure such as a low pressure bleed port of a turbocompressor engine which operates at a pressure less than 20 psi.

In addition to providing selective permeability to oxygen versus nitrogen, many nitrogen/oxygen separation membranes also exhibit selectivity for water vapor as well, allowing water vapor to be removed from the NEA in addition to oxygen. This can be particularly useful for systems utilizing PEM electrolyte cells or phosphoric acid electrolyte cells where water is produced at the cathode so that the NEA has a relatively high water content. In some embodiments, removal of additional oxygen from the already oxygen-depleted air produced at the cathode of the electrochemical cell is not needed or desired, but it can still be beneficial to remove water. For example, dry inert gas can be used for fuel tank inerting, whereas the humidity content of inert gas is of less concern during cargo hold fire suppression low rate of discharge. In such embodiments, a nitrogen/oxygen membrane separator can be used for water separation where water-containing NEA is directed to a first side of a selectively water-permeable membrane at sufficient pressure to provide a pressure gradient that favors water vapor transport through the membrane. In another embodiment, a membrane separator can be used where water-containing NEA is directed to a first side of a selectively water-permeable membrane and a gas having a lower partial pressure of water vapor than the partial pressure of water vapor in the NEA is disposed on a second (water removal) side of the membrane. In some embodiments, the partial pressure of water vapor on the first side of the membrane is higher than the partial pressure of water vapor on the second side of the membrane to provide a partial pressure gradient sufficient to promote water transport across the membrane. In some embodiments such as a PEM electrochemical cell, the relative humidity of the NEA gas discharged from the cathode will be at or close to 100%. The partial pressure gradient can be provided by a sweep gas on the second side of the membrane with a low amount of water vapor. In some embodiments, the sweep gas has a relative humidity of less than 100%, more specifically less than 50%, and even more specifically less than 5%. In some embodiments, the sweep gas has 0% relative humidity. In some embodiments, the sweep gas can be outside (ram) air (unless it is raining, in which case the humidity should be removed from the outside (ram) air). In some embodiments, conditioned air from the vehicle ECS (with some water removed) can be used as a sweep gas. In some embodiments, cabin air (which is conditioned air with some humidity added back due to exhaled air from passengers), or engine fan air (same absolute humidity as ram air but higher temp due to compression work), or bleed air, etc. can be used as a sweep gas. Gas membrane separators relying on a partial pressure difference of water vapor do not necessarily require the same bulk gas pressure differentials necessitated for the separation of nitrogen and oxygen, and in some embodiments the bulk gas pressure on both sides of the membrane differs by an amount less than 10 psi, more specifically less than 5 psi, including embodiments where there is no difference in bulk gas pressure on both sides of the membrane.

Figure 5:
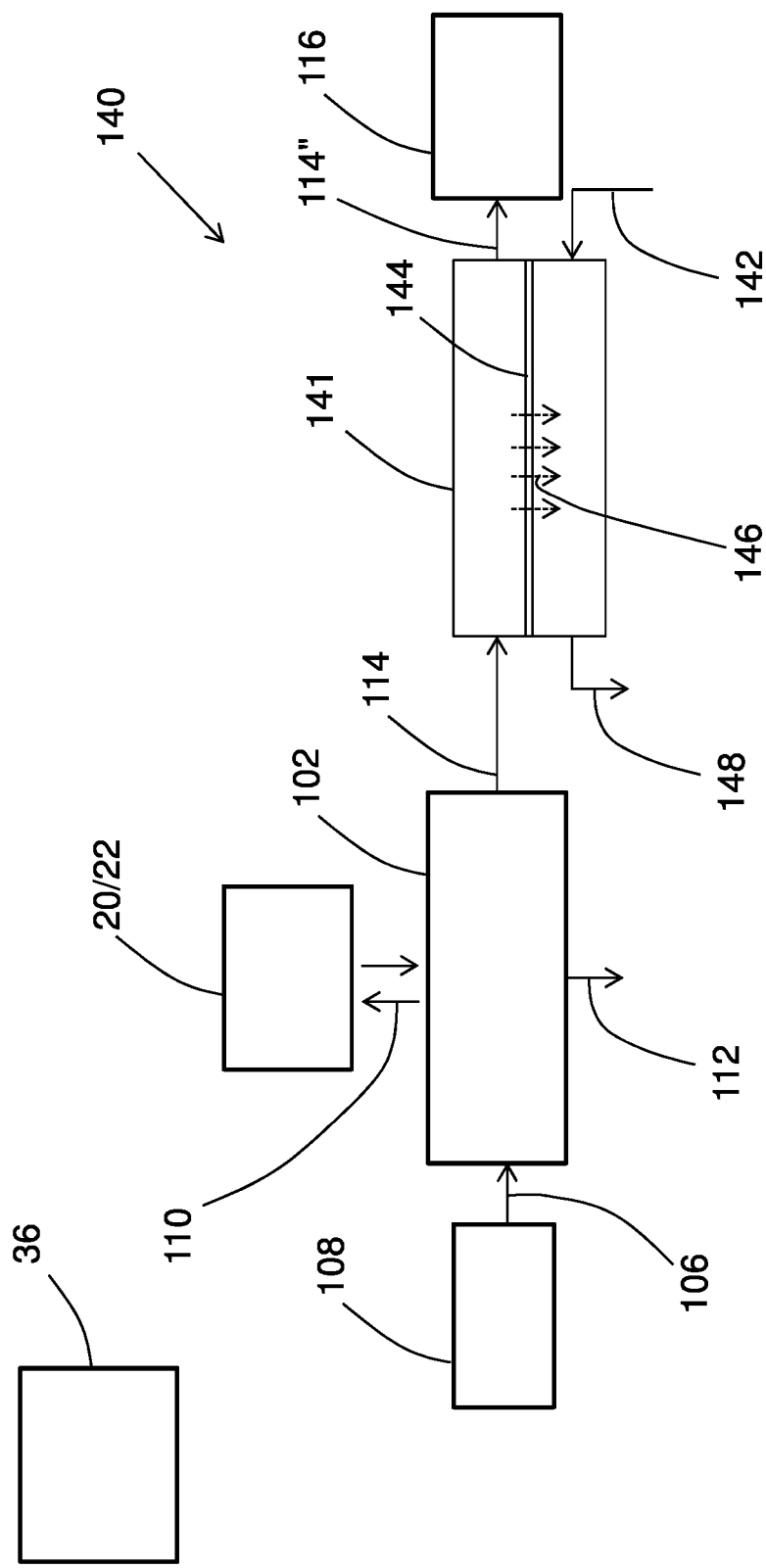
FIG. 5 is a schematic depiction of an example embodiment of an inert gas system comprising an electrochemical cell and a water permeable membrane gas separator.

An example embodiment of a system 140 utilizing a partial pressure differential membrane gas separator 141 is schematically depicted in FIG. 5. As shown in FIG. 5, a sweep gas 142 having a water vapor partial pressure less than that of the NEA 114 (e.g., cabin air or other low-humidity air from an onboard ECS system) is directed across a second side of water-permeable membrane 144 while the NEA 114 is directed across a first side of the water-permeable membrane 144 water vapor the partial pressure differential. The partial pressure differential will cause water 146 to diffuse through the water-permeable membrane 144 from the stream of NEA 114. After passing through the membrane 144, water 146 is mixed with and carried along by the stream of sweep gas 142, exiting the system as water-containing sweep gas 148, and low moisture nitrogen-enriched air 114" can be directed to onboard NEA-consuming systems 116.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:
1. An on-board vehicle inert gas system, comprising:
a plurality of electrochemical cells, individually comprising a cathode and an anode separated by an electrolyte separator;
a cathode fluid flow path in fluid communication with the cell cathodes that receives a flow of air from an air source and discharges nitrogen-enriched air;
an anode fluid flow path in fluid communication with the cell anodes;
an electrical circuit connecting the anode and the cathode, and an electrical power source connected to the electrical circuit that provides power to the electrical circuit at a voltage that electrolyzes water at the anode and forms water at the cathode or that reduces oxygen at the cathode and forms oxygen at the anode;
a membrane gas separator comprising a membrane having a greater permeability to oxygen or water than to nitrogen, a nitrogen-enriched air flow path along a first side of the membrane that receives nitrogen-enriched air from the cathode fluid flow path and discharges the nitrogen-enriched air to a fuel tank, a fire suppression system, or both a fuel tank and a fire suppression system, and an exhaust flow path along a second side of the membrane that receives oxygen or water or both oxygen and water through the membrane for exhaust from the on-board inert gas system.

2. The system of claim 1, wherein the membrane has a greater permeability to oxygen than to nitrogen.

3. The system of claim 2, wherein the membrane comprises hollow tubes or fibers, with the nitrogen-enriched air flow path along the hollow interior of the tubes or fibers and the exhaust flow path along the exterior of the tubes or fibers.

4. The system of claim 2, wherein the pressure along the first side of the membrane is at least 10 psi higher than the pressure along the second side of the membrane.

5. The system of claim 4, wherein the air source comprises a compressor section of an onboard turbocompressor engine, a mechanically driven compressor, or an electrically powered compressor.

6. The system of claim 5, wherein the compressed air is at a pressure of 5-20 psi.

7. The system of claim 2, wherein the nitrogen-enriched air discharged from the membrane gas separator comprises less than 10 ppm oxygen by weight, and is delivered to a liquid fuel space in the fuel tank.

8. The system of claim 2, further comprising a controller configured to operate each of the electrochemical cell and the membrane gas separator at a specified nitrogen-enriched air production capacity according to predetermined criteria based on impact on fuel burn and demand for nitrogen-enriched air.

9. The system of claim 8, wherein the controller is configured to operate the membrane gas separator continuously to provide a baseline nitrogen-enriched air production capacity and to operate the electrochemical cell intermittently or at a variable nitrogen-enriched air production capacity in response to demand for nitrogen-enriched air.

10. The system of claim 8, wherein the controller is configured to operate the electrochemical cell continuously to provide a baseline nitrogen-enriched air production capacity and to operate the membrane gas separator intermittently or at a variable nitrogen-enriched air production capacity in response to demand for nitrogen-enriched air.

11. The system of claim 8, wherein the controller is configured to operate the membrane gas separator at a nitrogen-enriched air production capacity based on availability and pressure of air from the air source, and to operate the electrochemical cell at a variable nitrogen-enriched air production capacity in response to the nitrogen-enriched air production capacity of the membrane gas separator and demand for nitrogen-enriched air.

12. The system of claim 8, further comprising a bypass around the membrane gas separator for nitrogen-enriched air from the cathode flow path, wherein the controller is configured to operate the electrochemical cell continuously as a source of nitrogen-enriched air through the bypass, and to redirect nitrogen-enriched air away from the bypass and through the membrane gas separator in response to a nitrogen-enriched air demand signal.

13. The system of claim 2, further comprising a bypass for the flow of air around the electrochemical cell to the membrane gas separator, wherein the controller is configured to operate the membrane gas separator continuously as a source of nitrogen-enriched air, and to redirect nitrogen-enriched air away from the bypass and through the electrochemical cell to operate in response to a nitrogen-enriched air demand signal.

14. The system of claim 2, wherein the electrolyte is selected from a polymer electrolyte proton-transfer medium, a solid oxide, or phosphoric acid.

15. The system of claim 1, wherein the membrane has a greater permeability to water than to nitrogen, and a relative humidity difference between the gases on the first and second sides of the membrane provides a water vapor partial pressure gradient to promote transfer of water vapor across the membrane than the partial pressure of water vapor along the second side of the membrane.

16. The system of claim 15, wherein bulk gas pressure on the second side of the membrane is less than 10 psi different than bulk gas pressure on the first side of the membrane.

17. The system of claim 15, wherein the electrolyte comprises a polymer electrolyte proton-transfer medium or phosphoric acid.

18. The system of claim 1, wherein the electrochemical cell is configured to operate in either
   a first mode in which water or air is directed to the anode, electric power is provided to the electrical circuit at a voltage that electrolyzes water at the anode or that reduces oxygen at the cathode, or
   a second mode in which fuel is directed to the anode, and electric power is directed from the circuit to one or more vehicle electric power-consuming systems or components.

19. The system of claim 1, comprising a plurality of said electrochemical cells in electrical series in a stack.

20. A method of generating inert gas on board a vehicle, comprising:
   providing water or air at an anode of an electrochemical cell, providing air at a cathode of the electrochemical cell, providing electric power to a circuit connecting the anode and the cathode at a voltage to electrolyze water at the anode or reduce oxygen at the cathode;
   generating nitrogen-enriched air at the cathode of the electrochemical cell;
   directing the nitrogen-enriched air from the cathode of the electrochemical cell to a nitrogen-enriched flow path on a first side of a membrane having a greater permeability to oxygen or water than to nitrogen;
   transporting oxygen or water from the nitrogen-enriched flow path across the membrane to a second side of the membrane; and
   and directing nitrogen-enriched air from the nitrogen-enriched flow path on the first side of the membrane to a fuel tank, a fire suppression system, or both a fuel tank and a fire suppression system.

21. The method of claim 20, further comprising directing oxygen-enriched air from the anode of the electrochemical cell to a flight deck, or to a cabin, or to an engine intake, or to an emergency oxygen system.

22. The system of claim 1, further comprising an oxygen-enriched air flow path from the anode fluid flow path to of the electrochemical cell to a flight deck, or to a cabin, or to an engine intake, or to an emergency oxygen system.

* * * * *